Aug. 28, 1923.
M. B. FIELD
GAUGE
Filed May 2, 1921
1,466,359
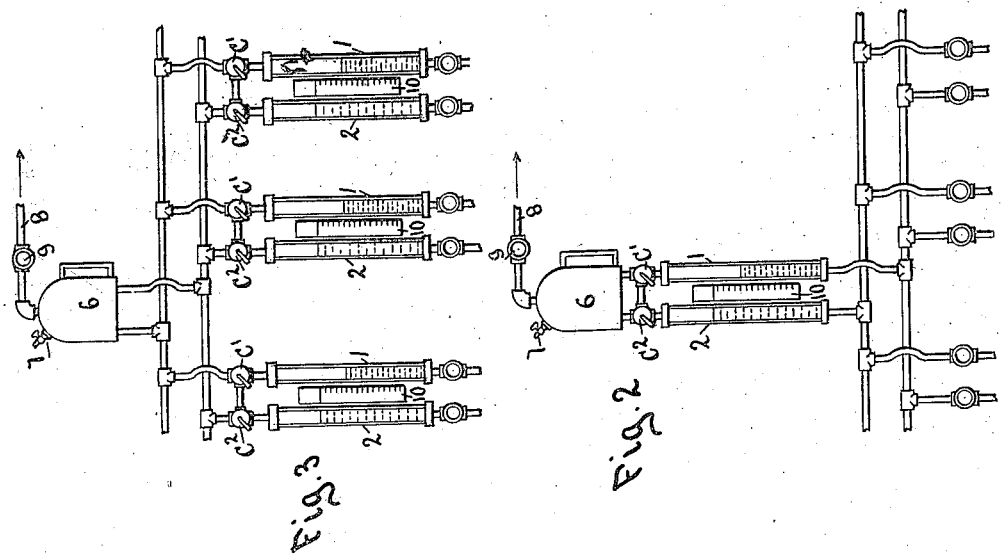
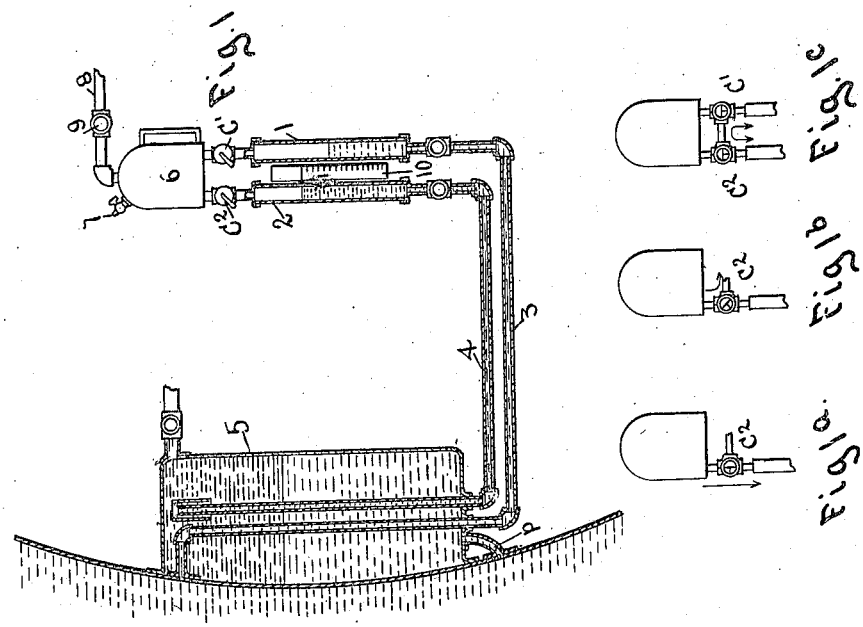
INVENTOR
Michael Birt Field
by Wright, Brown, Quinby they
att'ys Patented Aug. 28, 1923.

1,466,359

UNITED STATES PATENT OFFICE.

MICHAEL BIRT FIELD, OF GLASGOW, SCOTLAND, ASSIGNOR TO PNEUMERCATOR COMPANY, OF NEW YORK, N. Y., A CORPORATION OF MAINE.

GAUGE.

Application filed May 2, 1921. Serial No. 466,053.

*To all whom it may concern:*

Be it known that I, MICHAEL BIRT FIELD, a subject of the King of the United Kingdom of Great Britain and Ireland, and residing at Glasgow, Scotland, have invented a certain new and useful Improvement in Gauges, of which the following is a specification.

This invention relates to an improved apparatus for ascertaining at a distant station the position of the plane of demarcation between two immiscible liquids in a tank or other vessel filled with such liquids, or for ascertaining the weight, height or volume of either or both liquids in the tank or other vessel, or the total weight of the liquid contents of such tank or vessel.

In the accompanying drawings Fig. 1 represents diagrammatically an adaptation of the invention for ascertaining the position of the plane of demarcation of fuel oil and sea water contained in a compensated fuel tank in a submarine or ship, the tank having a connection to the sea for admission of sea water to take the place of fuel oil as the latter is expended. For the purpose of the diagram it is assumed that the oil is lighter than sea water and that it occupies accordingly the upper portion of the tank.

Figs. 1ª, 1ᵇ, and 1ᶜ are detail views representing in different positions valves between two gauge glasses and a closed chamber hereinafter referred to.

Fig. 2 represents diagrammatically an installation suitable for a number of similar tanks with one indicating instrument.

Fig. 3 represents diagrammatically an installation suitable for a number of dissimilar tanks with one indicating instrument per tank.

The same reference characters denote similar parts in the several views.

The apparatus shown in Fig. 1 comprises two gauge glasses 1, 2 or the like located at the observation station, the lower end of the glass 1 being connected to a pipe 3 in communication with the sea water outside the submarine, and the lower end of the other glass 2 being connected to a pipe 4 which terminates inside the tank 5 containing the immiscible liquids, in the instance shown near to the top of the tank 5, the two pipes 3, 4 being as far as possible laid closely alongside one another so as to be subject to the same temperature conditions. (It is not necessary that the pipe 3 be led through the tank 5 as shown in Fig. 1. The pipe 3 may be otherwise led to any suitable point outside the vessel and below the water line, it being important always that the pipes 3 and 4 be as nearly as possible at the same temperature.) By means of suitable valves or cocks C¹, C², the upper ends of the gauge glasses 1, 2 may be put in communication with each other, or may be put singly or both together in communication with a closed chamber 6 fitted with a pet cock or valve 7 for venting to the surrounding atmosphere and connected with an air pressure supply line 8 under the control of a valve 9.

By adjustment of the valves C¹, C², sea water may be admitted to the chamber 6, and then by the action of air under pressure driven through the pipe 4 leading to the tank 5 until the pipe 4 is entirely full of sea water, sea water thus introduced into the tank 5 at or near the top descending to the bottom of the tank and displacing the same amount of sea water from the bottom of the tank 5, the displaced water passing to the sea by way of the pipe P. Then the two gauge glasses 1, 2 are put in communication with one another with a suitable quantity of air trapped in the upper portions of the glasses, the glasses with the connection between the same forming in effect an inverted U-tube. The difference in level now attained by the liquids in the two gauge glasses 1, 2 furnishes an indication of the difference of head of a column of sea water equal in height to the height of the upper end of the pipe 4 above the bottom of the tank 5 and of a corresponding column of sea water and oil as it exists in the tank 5.

In conjunction with the gauge glasses 1, 2 there is or may be employed a shiftable scale 10 the zero mark of which can be set to one of the two levels, so that the difference can be read directly off the scale. The scale may be marked to indicate not only the position of the plane of demarcation in the tank, but also the weight or volume of the oil or water in the tank, or the weight of the total liquid contents of the tank.

With provision of suitable connections gauge glasses, etc., a like arrangement may be made to serve a number of tanks or vessels as will be understood from reference to Figs. 2 and 3 without further explanation.

A gauge according to the invention is equally serviceable when the liquid fuel or other liquid required to be drawn off is heavier than water and occupies the lower portion of the tank.

In the latter alternative the fuel draw off pipe is of course placed near the bottom of the tank.

From the foregoing it will be seen that I have provided an apparatus including tubes connected to a gauge at least one of which tubes communicates with the interior of the tank or vessel, said apparatus being arranged to measure the difference in pressure head of a column of given height of one liquid and of a column of equal height composed of the two liquids as they exist within the tank or vessel.

I claim,

1. In combination, a tank containing immiscible liquids of different specific gravities and open to a volume of one of said liquids exterior to said tank, a gauge, and tubes connected to said gauge, one of said tubes communicating with the interior of said tank and another of said tubes being in connection with the liquid exterior to said tank, whereby said gauge is enabled to measure the difference in pressure head of a column of given height of the liquid exterior to said tank and of a column of equal height of the two liquids as they exist within said tank.

2. In combination, a tank containing immiscible liquids of different specific gravities and open to a volume of one of said liquids exterior to said tank, two gauge glasses, tubes connected to said gauge glasses, one of said tubes communicating with the interior of said tank and the other tube being in connection with the liquid exterior to said tank, a closed chamber, a pressure medium supply connection to said chamber, and connections between said gauge glasses and said chamber whereby said gauge glasses may be put in communication with each other and individually and conjointly in communication with said chamber.

3. In combination with a tank containing two immiscible liquids of different specific gravities, and having an outlet for one of the liquids and an inlet for the other liquid, such inlet being open to an external body of such other liquid under pressure, whereby pressure is imposed on the tank contents, a pipe line containing a pressure-transmitting fluid terminating in the upper part of the tank, another fluid-containing pipe line arranged to transmit the pressure imposed by said external body of liquid, and pressure indicating means connected with said pipe lines and arranged to correlate the pressures transmitted by them.

4. In combination with a tank containing two immiscible liquids of different specific gravities, and having an outlet for one of the liquids and an inlet for the other liquid, such inlet being open to an external body of such other liquid under pressure, whereby such pressure is imposed on the tank contents, a pipe containing one of said liquids entering the tank and open at its end to the tank contents near one of the extreme levels of the tank, and a gauge connected to said pipe and thereby caused to give pressure indications corresponding to the difference between the pressure head of a column of said liquid and that of a column of equal height of the two liquids as they exist in the tank.

5. In combination with a tank containing two immiscible liquids of different specific gravities, and having an outlet for one of the liquids and an inlet for the other liquid, such inlet being open to an external body of such other liquid under pressure, whereby pressure is imposed on the tank contents, a pipe containing one of said liquids open at its end to the tank contents near one of the extreme levels of the tank, a gauge connected to said pipe and thereby caused to give pressure indications corresponding to the difference between the pressure head of a column of one of the liquids, equal in height to the vertical distance from said pipe end to the opposite extremity of the tank and the pressure head of a column of equal height of the two liquids as they exist in the tank, and a second gauge arranged to show the pressure imposed by the external liquid, unaffected by the tank contents.

6. In combination with a tank containing two immiscible liquids of different specific gravities, and having an outlet for one of the liquids and an inlet for the other liquid, such inlet being open to an external body of such other liquid under pressure, whereby pressure is imposed on the tank contents, a differential pressure indicating apparatus, and two pipe lines leading respectively from opposite parts of said apparatus and containing a pressure transmitting fluid, one of said pipe lines extending to a part of the tank where it receives the internal pressure of the tank, modified by the pressure head of the tank contents, and the other pipe line terminating at a point, in connection with the external body of liquid, where it receives the full pressure thereof.

7. The combination with a tank adapted to be filled with immiscible liquids of relatively different specific gravities and having an external connection near one of its vertical extremities with an external body of liquid under pressure, of a tube adapted to contain a pressure transmitting fluid and opening into the tank near the opposite extremity of the latter from said external connection, a second tube, also adapted to contain a pressure transmitting fluid, in pressure receiving communication with said external body of liquid, and differential pressure indicating means coupled with said tubes to indicate the difference between the pressures in the fluids contained within said tubes.

8. In combination, a tank containing immiscible liquids of different specific gravities and being open to a volume of the heavier of said liquids under pressure exterior to the tank, a gauge, and tubes connected to said gauge, one of said tubes communicating with the lighter of the liquids inside the tank and another of said tubes being in communication at a corresponding level with the liquid exterior to the tank, said gauge being adapted to indicate the difference between the pressures transmitted through said tubes from the liquid with which the tubes are respectively in communication.

9. In combination, a tank adapted to contain immiscible liquids of different specific gravities and being in communication at its lower part with an external body of the heavier of said liquids under pressure, a tube containing a pressure transmitting medium opening into the upper part of the tank, a second tube containing a pressure transmitting medium in connection with the external body of liquid, and means for indicating the difference between the pressures existing in the two tubes, said indicating means thus being adapted to measure the fluctuations in height of the demarcation plane between the liquids in the tank.

10. In combination with a tank containing immiscible liquids of different specific gravities and being in communication near one of its vertical extremities with an external body of one of said liquids under pressure, means for indicating at a distance the height of the demarcation plane between said liquids comprising two tubes each containing a pressure transmitting fluid and one of them being in communication with one of the liquids in the tank and the other with the liquid external to the tank, the relative heights of such communications being such that the pressures applied to the transmitting fluids in the respective tubes are different in proportion to the difference between the pressure head of a column of given height of the liquid external to the tank and of a column of the same height of the superposed liquids within the tank, and a differential pressure indicator connected with said tubes and arranged to show the difference between such transmitted pressures.

11. In combination, a tank containing immiscible liquids of different specific gravities and the heavier of said liquids being in communication with a volume of the same liquid under pressure external to the tank, two gauge glasses, two tubes connected to said gauge glasses, one of said tubes communicating with the lighter of the liquids inside of the tank and the other being in connection at a corresponding level with the liquid exterior to the tank, a closed chamber, a pressure medium supply connection to said chamber, and connections between said gauge glasses and said chamber, whereby said gauge glasses may be put in communication with each other and individually and conjointly in communication with said chamber.

12. In a ship, a tank adapted to contain oil and having a sea connection through which the water external to the ship may enter to exert pressure on the oil and supplant displaced oil, a differential pressure indicator and tubes so connected with said indicator as to cause indication by the latter of the difference between the pressures existing in the tubes, one of said tubes being in pressure receiving communication with the body of oil in the tank and the other being in similar communication with the external water.

In testimony whereof I have signed my name to this specification in the presence of two subscribing witnesses.

MICHAEL BIRT FIELD.

Witnesses:
  ISABEL ROLLO,
  KATE FOTHERINGHAM.